United States Patent [19]

Talon

[11] Patent Number: 5,711,338
[45] Date of Patent: Jan. 27, 1998

[54] REGULATING DRUM FOR MULTIPHASE EFFLUENTS AND ASSOCIATED DRAW-OFF MEANS AND METHOD FOR OPERATING SAME

[75] Inventor: René Talon, Carrieres sur Seine, France

[73] Assignee: Institut Francais du Petrole, Rueil Malmaison, France

[21] Appl. No.: 615,267

[22] PCT Filed: Jul. 11, 1995

[86] PCT No.: PCT/FR95/00930

§ 371 Date: May 24, 1996

§ 102(e) Date: May 24, 1996

[87] PCT Pub. No.: WO96/02732

PCT Pub. Date: Feb. 1, 1996

[30] Foreign Application Priority Data

Jul. 13, 1994 [FR] France ................. 94 08766

[51] Int. Cl.$^6$ .................................................. F15D 1/00
[52] U.S. Cl. ................. 137/8; 137/88; 137/110; 210/97; 210/790; 166/53
[58] Field of Search ................. 137/1, 3, 8, 88, 137/110, 154, 590, 593, 599, 2, 89; 210/143, 188, 513, 739, 790, 800, 437, 85, 97, 115, 741, 742, 744, 747; 96/155, 156, 187; 261/76, DIG. 75; 166/267, 53, 369; 95/241, 1

[56] References Cited

U.S. PATENT DOCUMENTS

| | | |
|---|---|---|
| 1,011,482 | 12/1911 | Pemberton ................. 210/437 |
| 1,290,513 | 1/1919 | Collins et al. ................. 137/8 |
| 3,025,880 | 3/1962 | Anderson . | |
| 3,208,719 | 9/1965 | Hulsey . | |
| 5,194,344 | 3/1993 | Macy ................. 166/267 |
| 5,254,292 | 10/1993 | Gabryelczyk et al. ........ 261/DIG. 75 |
| 5,375,618 | 12/1994 | Giannesini ................. 137/110 |
| 5,377,714 | 1/1995 | Giannesini et al. ................. 137/110 |
| 5,421,357 | 6/1995 | Levallois ................. 137/8 |

FOREIGN PATENT DOCUMENTS

| | | |
|---|---|---|
| 339187 | 1/1989 | European Pat. Off. . |
| 2642539 | 2/1989 | France . |
| 842124 | 7/1952 | Germany . |
| 1129506 | 10/1968 | United Kingdom . |
| 2179450 | 3/1987 | United Kingdom . |

*Primary Examiner*—Joseph W. Drodge
*Attorney, Agent, or Firm*—Antonelli, Terry, Stout, & Kraus, LLP

[57] ABSTRACT

The invention is a system for drawing off multiphase effluents. The system includes a drum; at least one assembly, located in the drum, for drawing a multiphase fluid contained in the drum to outside the drum, the at least one assembly including a section through which the multiphase fluid is drawn to flow outside the drum, and extending over a substantial portion of a height of the drum; at least one sensor for sensing at least one flow condition of the multiphase fluid and for providing a signal representing each sensed flow condition of the multiphase fluid; and a mechanism, coupled to the at least one sensor, for modifying the section of multiphase flow as a function of each signal representing a sensed flow condition.

12 Claims, 5 Drawing Sheets

FIG.6
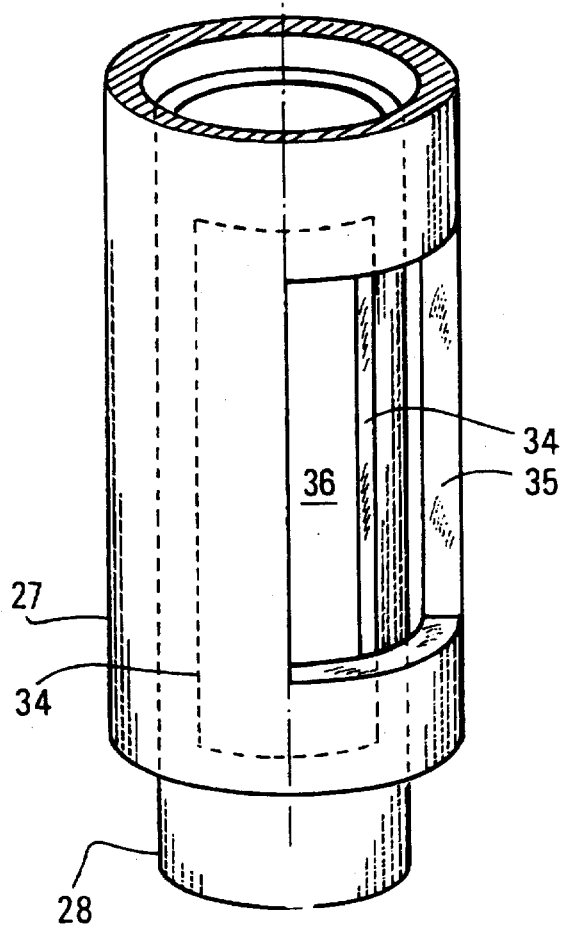
FIG.6A
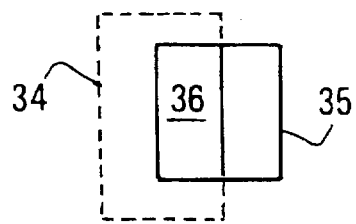
FIG.6B        FIG.6C
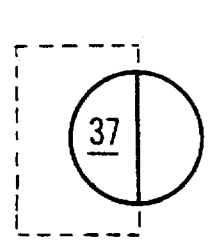   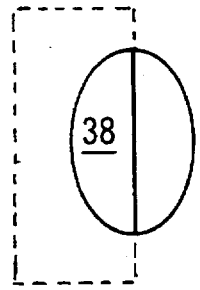
FIG.6D        FIG.6E
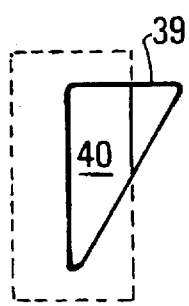   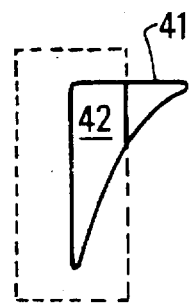
FIG.6F        FIG.6G
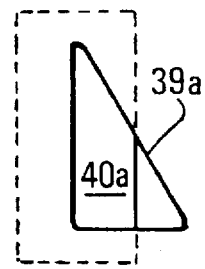   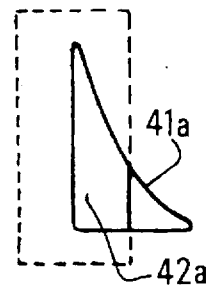
FIG.6H
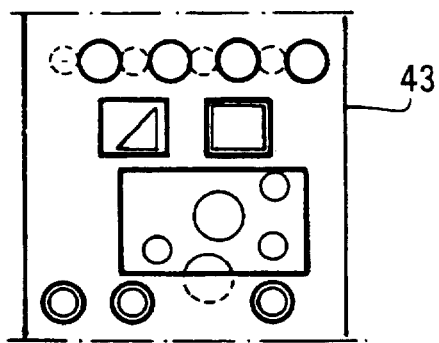

5,711,338

REGULATING DRUM FOR MULTIPHASE EFFLUENTS AND ASSOCIATED DRAW-OFF MEANS AND METHOD FOR OPERATING SAME

BACKGROUND OF THE INVENTION

1. Field of the Invention

The present invention relates to a regulating drum for multiphase fluids and associated draw-off means.

2. Description of the Prior Art

The flow of fluids consisting of a mixture of gas, liquid and possibly solid matter entails considerable flow regulation problems. In fact, the behaviour of multiphase fluids is much more complex than that of single-phase flows. These flow regulation problems are all the more critical since the fluid has to be compressed in a rotating or reciprocating machine.

The prior art can be illustrated by French Patent 2,642,539 (U.S. Pat. No. 5,254,292). The means for drawing off the multiphase effluent described in the French Patent has sections of flow that are constant in time and that do not allow a good adjustment to the conditions of flow of the multiphase fluid. This will be explained hereafter in the detailed description in connection with FIGS. 1 to 3.

SUMMARY OF THE INVENTION

The invention is a device allowing multiphase flows to be better controlled.

The principal concept of the invention lies in the fact that draw-off assembly have adjustable draw-off sections. Furthermore, the adjustable sections of flow are distributed at different heights, for example on a vertical or an inclined line, on either side of the gas-liquid separation zone or interface under normal working conditions. An interlace position variation thus leads to an automatic level regulation effect. According to the present invention, it is not necessary to stop the multiphase flow and to disassemble elements of the drum plus draw-off assembly in order to adjust the sections of flow of the draw-off assembly. The draw-off assembly according to am present invention can be called a variable geometry means.

Furthermore, the regulating drum functions as a surge drum on account of the residence time of the multiphase fluid within the capacity it represents.

Since the dimensions of the regulating system utilize only simplified fluid mechanics equations, it will be easy to determine the size and the transfer laws of this drum.

The present invention provides satisfactory running of a multiphase pumping device, although the physical conditions of the multiphase fluid to be pumped (notably the GLR, the pressure, etc.) vary within a wide range.

The GLR (Gas to Liquid Ratio) is a volumetric ratio that characterizes a multiphase flow. The GLR is equal to the ratio of the volume of gas to the volume of liquid.

The present invention is well suited to the field of petroleum exploration. In fact, certain producing wells produce a mixture of liquid (oil and/or water) and gas that has to be transferred onto a site where it is used or stored. It is traditionally transferred by separating the gas and the liquid, then by compressing the gas and by pumping the liquid separately. The use of a multiphase pump allows the gas and the liquid to be pumped together by means of a single operation. The multiphase pumps used for performing this type of transfer accept a limited GLR variation at their inlet. In order to adapt the running of these pumps to the characteristics of the fluid coming from producing wells, a regulating drum has to be interposed between the wells and the pump.

The object of the present invention is to provide an improved regulating drum allowing a possibly permanent adjustment of the draw-off assembly to the variations in the conditions of flow of the well, notably to its composition variation.

The present invention relates to a drum comprising at least one the draw-off assembly for drawing off the fluid contained in the drum the draw-off assembly comprises a section of flow for taking the said fluid out, that extends over a substantial portion of the height of drum. The drum according to the according to the invention is characterized in that the draw-of assembly comprises means for modifying the section of flow.

The draw-off and flow section modification assembly can comprise at least two perforated surfaces that move with respect to one another so as to modify said section of flow.

These surfaces can be cylinders of preferably coaxial revolution.

One of the cylinders can be fixed with respect the drum and the other can be mobile in rotation about its axis of revolution, and the mobile cylinder can comprise rotation means exterior to said drum.

The cylindrical tubes can be vertical when the drum is in operating position.

The drum according to the invention can include a cylindrical casing. The cylindrical casing and the draw-off assembly can be so positioned with respect to one another that, in operating position, the axis of the cylindrical casing is either vertical or horizontal.

The section of flow of the draw-off assembly can be located substantially on the opposite side with respect to the fluid inlet port in the regulating drum, in relation to the axis of the draw-off assembly.

The draw-off assembly can comprise at least one additional fixed section located in the lower part of said draw-off assembly for drawing off a liquid phase.

The draw-off assembly can comprise at least one additional fixed section located in the upper part of said draw-off assembly for drawing off a gas phase.

The draw-off assembly can be connected to the suction side of a multiphase pump.

The means for modifying the section of flow can be controlled as a function of at least one quantity related to the physical conditions of the fluid to be processed upstream and/or in the surge drum and of the mechanical working conditions of the pump.

The present invention also relates to a process for regulating a multiphase effluent. This process comprises the steps as follows:

a) flowing the multiphase effluent into a surge drum comprising means for drawing off the multiphase effluent;

b) adjusting the section of flow provided for the multiphase effluent on the draw-off means as a function of predetermined flow conditions.

BRIEF DESCRIPTION OF THE DRAWINGS

Other features and advantages of the present invention will be clear from reading the description hereafter, given by way of non limitative example, with reference to the accompanying drawings in which:

FIG. 6 shows a detail of the draw-off assembly;

FIGS. 6a to 6h show different shapes for the openings of the cylinders of the draw-off assembly;

DESCRIPTION OF THE PREFERRED EMBODIMENTS

Figure 1:
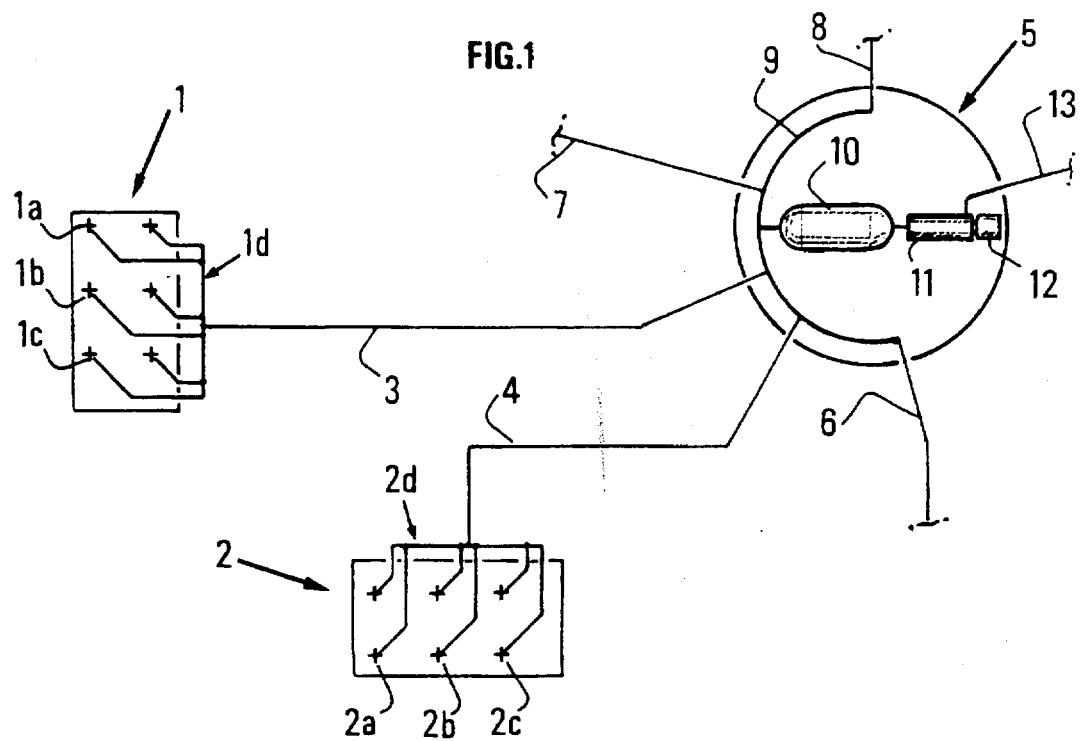
FIG. 1 is an overall view of a production pattern.

In FIG. 1, reference numbers 1 and 2 refer to two oil production zones. Each one can comprise several production wells 1a, 1b, 1c, 2a, 2b all of the production of each of these zones being collected through a pipe 1d and 2d respectively for zones 1 and 2. Line 3 connects the first oil production site to a pumping station. Line 4 connects the pumping station 5 to all the producing wells of the second zone. Various collecting lines coming from different production sites join the pumping station 5, such as lines 6, 7 and 8. The production coming from these various lines is gathered by a collector 9 that feeds the regulating drum 10. This drum is connected to the suction side of a pump 11 driven by a motor such as an electric motor 12. The fluid pumped by pump 11 is conveyed through pipe 13 towards a point of destination that is not shown, for example a main platform according to the patterns illustrated U.S. Pat. No. 5,226,482 whose content incorporated by reference herein.

Figure 2:
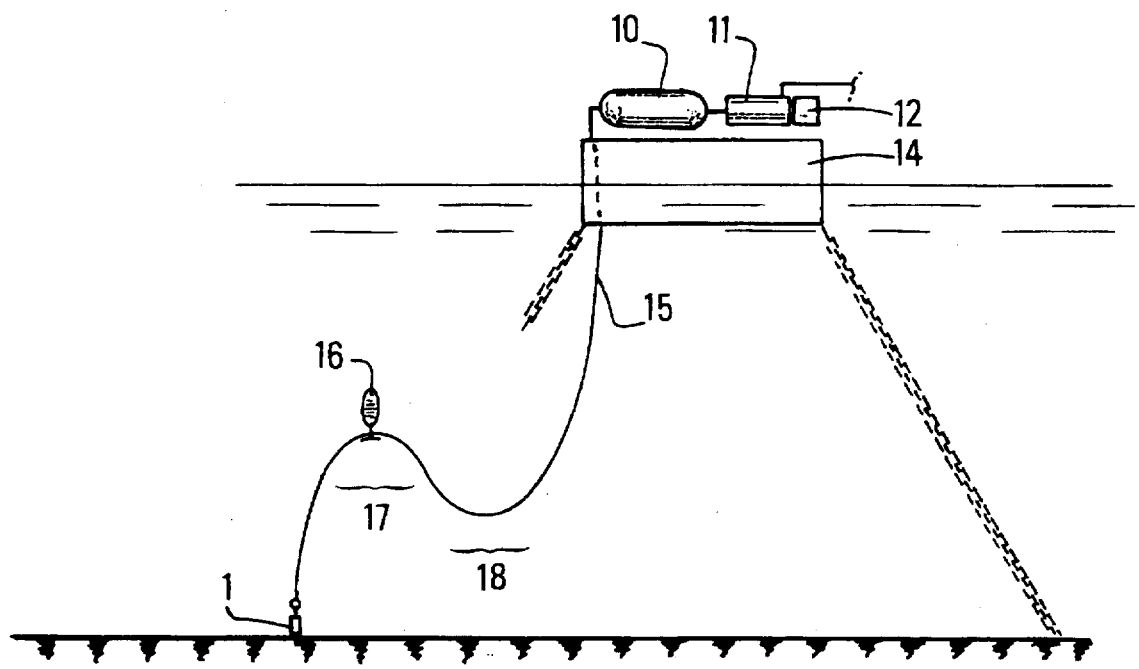
FIG. 2 shows an example of application of the invention to the marine sphere.

Such a pattern can particularly apply to offshore production as illustrated in FIG. 2. The well 1 is connected to a floating buoy 14 by a flexible line 15. This flexible line can be S-shaped by using a buoy 16. The regulating drum 10, the pump 11 and the driving motor 12 are placed on buoy 14.

According to the wave motions and to the meteorological conditions, the system of FIG. 2 can lead to changes in the characteristics of the fluid to be pumped at the inlet of the pump. In fact, the S shape and the vertical reciprocations of the two loops 17 and 18 of the flexible pipe lead to variations in the characteristics of the multiphase flow which are superposed on the variations in the GLR of the effluent at the outlet of multiphase wells. These variations notably concern the multiphase flow type, the GLR, etc.

Figure 3:
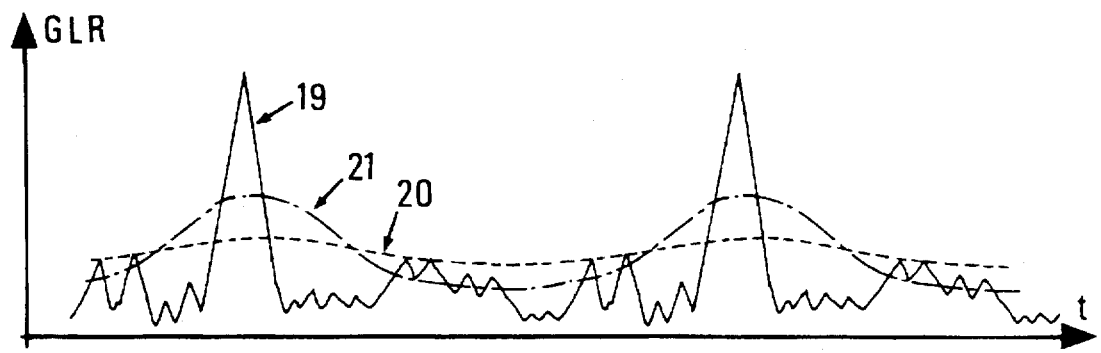
FIG. 3 shows the effects of the regulating drum according to the present invention.

The curves in FIG. 3 illustrate the time-dependent GLR variations with and without the use of a regulating drum according to the invention.

Curve 19 shows the GLR variation obtained at the inlet of the regulating drum 22 for a multiphase fluid coming from a well at a given time of the production. It can be noted that this curve exhibits many sudden variations in the GLR value.

By using a regulating drum equipped with draw-off assembly according to the invention, the drum and its equipments are adjusted to the characteristics of the fluid, the GLR variation curve of the fluid at the outlet of the drum represented by the damped curve 20 is obtained.

However, during production, or under the effect of external phenomena, for example a wave motion effect, the characteristics of the fluid coming from the well may change, notably the value of its GLR. The regulating drum and its draw-off assembly are then no longer suited in an optimum way, and the damped curve 20 then changes into a curve 21 that comprises variations of greater amplitude than those of curve 20. The present invention reduces the fluctuations of curve 21 to a lower level, for example a level similar to that of curve 20, by using an adjustable draw-off assembly, while the production conditions of the multiphase fluid at the inlet of tile regulating drum have changed.

The invention is applicable to any other situation where such variations and amplitudes can be observed, be it on an onshore or an offshore site. The device according to the present invention can be used for controlling flows that are disturbed by pipes or for adapting the evolution of the production of wells or of tile number of production wells.

Figure 4:
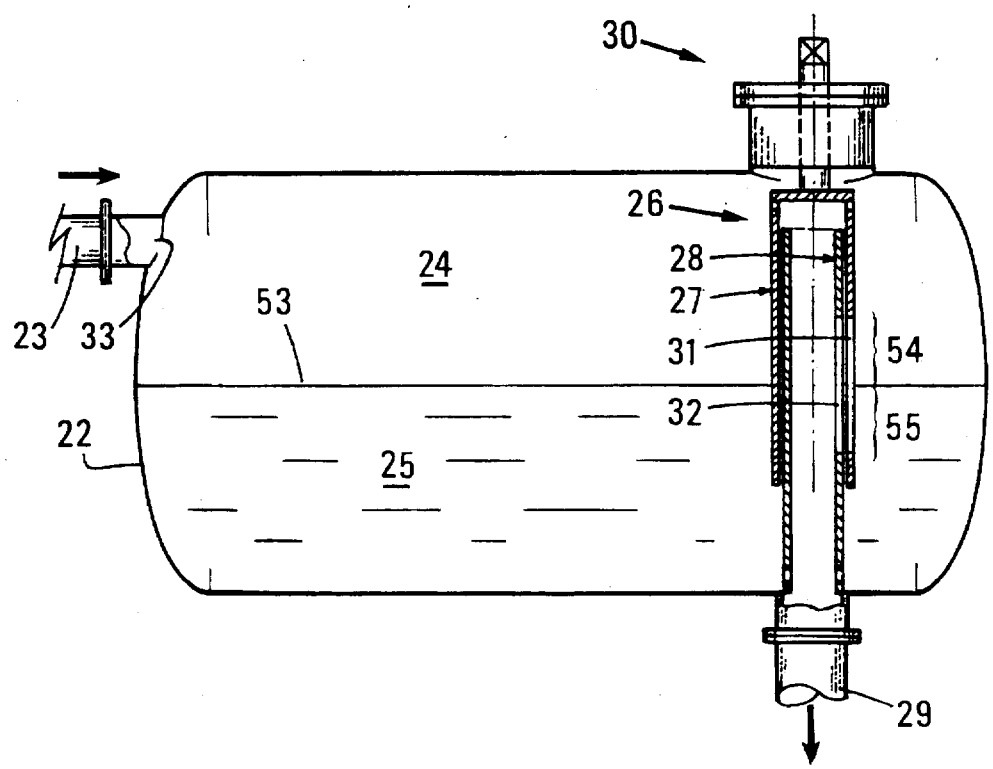
FIG. 4 is a schematic view of a regulating drum equipped with a sample tube according to the present invention.

FIG. 4 diagrammatically shows the device according to the invention. Reference number 22 refers to the regulating drum, reference number 23 relates to the line supplying the multiphase fluid to be processed and opening into the regulating drum through a port 33. The fluid then flows into the regulating drum or capacity 22 and divides into a gas phase 24 and a liquid phase 25 possibly comprising solids such as sand. The draw-off assembly according to the invention represented as a whole by reference number 26 comprises, in the particular embodiment of FIG. 4, a first tube or external cylinder 27 surrounding an internal tube or cylinder 28. The external cylinder 27 can turn round on itself with respect to its axis of revolution 29, with the aid of control 30. The external tube 27 comprises for example several openings 31 and the internal tube 28 comprises openings 32. The openings or recesses 31 and 32 co-operate with one another for limiting the section of flow of the multiphase effluent or fluid. The section of flow will depend for example on the GLR variations of the multiphase effluent to be processed.

It can be seen in FIG. 4 that the openings or ports 32 and 31 are located on the opposite side with respect to the inlet port 33 of the multiphase fluid in the drum, in relation to the axis of revolution 29 of the tubes 27 and 28, which are coaxial. This allows openings 31 and 32 to be protected against the eddies that can result from the inflow of the multiphase fluid in the regulating drum.

FIG. 6 is a perspective view of the running of cylinders 27 and 28. Reference number 34 refers to the opening of the internal tube 28 and reference number 35 refers to the opening of the external tube 27. The overlapping zone 36 corresponds to the zone really provided for the passage of the multiphase fluid. FIG. 6A shows a developed view of the sections of flow of the cylinders 27 and 28 corresponding respectively to openings 34 and 35.

In FIG. 6A, the opening 34 of the internal tube and the opening 35 of the external tube are rectangular. The shape of the section of flow really provided for the multiphase effluent is a rectangular shape. FIGS. 6A to 6H show, in a non limitative way, different possible opening shapes for tubes 27 and 28. In FIGS. 6A to 6G, the shape of the opening provided on the internal tube is still rectangular. In FIG. 6B, the shape of the opening provided on the external tube 27 is a circle. The co-operation of the openings of the internal tube and of the external tube allows a segment of circle 37 to be left free. In FIG. 6C, the free section is a segment of ellipse 38. FIG. 6D shows, for the external tube, an opening of triangular shape 39. The section of flow 40 due to the co-operation of the two tubes has in this case the shape of a trapezoid. In FIG. 6E, one of the sides of triangle 39 of FIG. 6D has been replaced by a curvilinear curve defining area 42 allowing better adjustment of the shape of opening 41 to the characteristics of the multiphase fluid.

FIGS. 6F and 6G show symmetrical shapes in relation to the opening shapes of the external tube shown in FIGS. 6D and 6E. They bear respectively reference numbers 39a and 41a and give respectively a section of flow 40a and 42a. Other shapes can of course be used in order to solve the problem according to the present invention. In FIG. 6H, the openings of the internal tube can thus be multiple and have circular shapes, as well as the shapes of the openings of the external tube 43.

Figure 5:
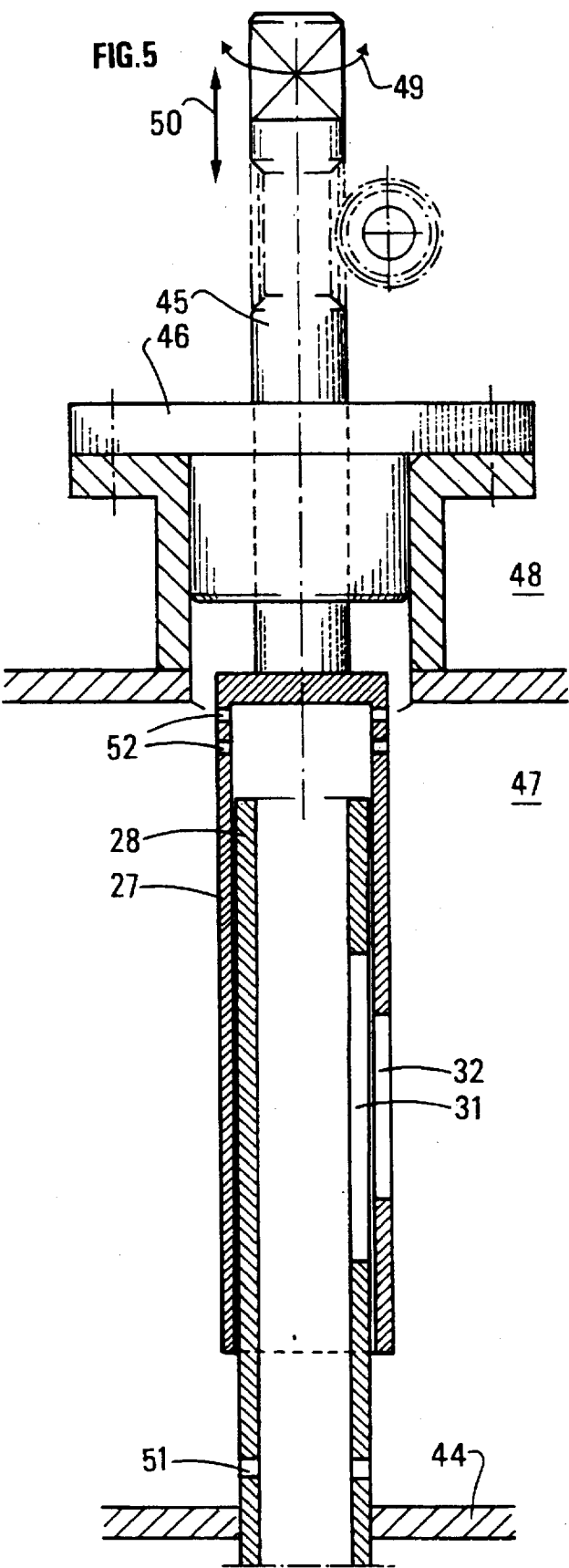
FIG. 5 shows a system for controlling the draw-off assembly.

FIG. 5 shows in a more detailed way an embodiment of the draw-off assembly according to the present invention. The internal tube 28 is integral with the wall 44 of the regulating drum, whereas the external tube 27 is integral with a rod 45 that runs through a packing box 46 providing a seal between the inner zone 47 of the regulating drum and the outside environment 48. Rod 45 allows, through a rotation shown by arrows 49, variation of the opening zone left free at the time of the passage of the multiphase effluent. This zone results from the co-operation of tubes 27 and 28. According to a variant of the present invention, a translation motion represented by arrow 50 can be imparted to rod 45, which allows the section of flow provided for the multiphase effluent to be varied. The internal tube 28 comprises, at its base, ports 51 that are not covered by the external tube 27. Similarly, the external tube 27 comprises, in its upper part, ports 52 that are not covered by the internal tube 28.

The running of the device according to the invention is described hereafter. The multiphase effluent flowing in through port 33 enters the drum 22 where it divides, on the one hand, into a liquid phase 25 and, on the other hand, into a gas phase 24. The openings represented by reference number 54 (FIG. 4) allow passage of the gas and the openings beating reference number 55 (FIG. 4) allow passage of the liquid. If the liquid level in the surge drum increases, the zone or section provided for the passage of the liquid will increase, and the zone or section provided for the passage of the gaseous effluent will be reduced. This results from the fact that the drum has a characteristic of self-regulation of the multiphase flow, as described in U.S. Pat. No. 5,254,292. The description of French Patent No. 2,642, 539 is incorporated by reference in its entirety.

As stated above, it can be advisable, for a better control of the GLR fluctuations at the inlet of the regulating drum, to be able to act upon the sections of flow provided on the one hand for the liquid and on the other hand for the gas during operation.

Figure 7:
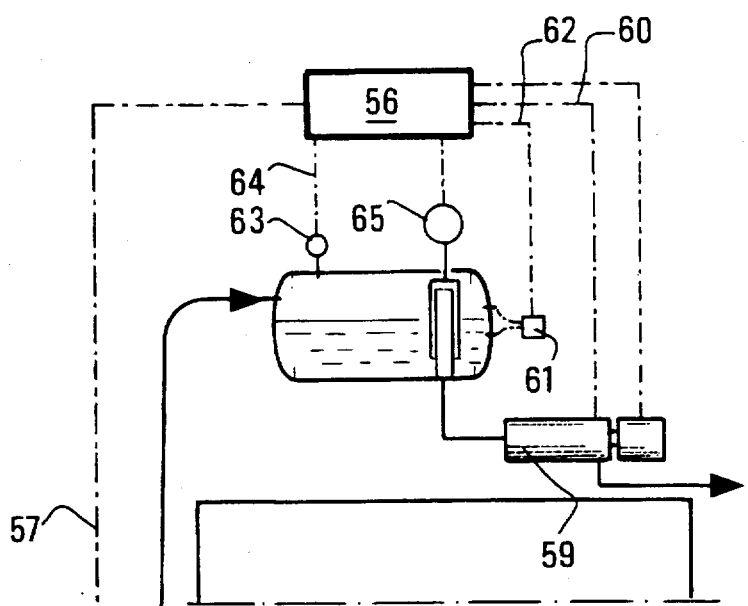
FIG. 7 shows a system according to the present invention equipped with means for regulating and for controlling the draw-off assembly.

This effect is obtained by varying the position of the casing or external tube 27 with respect to the internal tube 28. This position can be varied as a function, for example, of the GLR variations of the multiphase fluid detected at the inlet of the surge drum. The external tube can be moved with respect to the internal tube, for example, after working out the average, over a certain period, of the GLR variations at the inlet of the regulating drum. Control of the position of the external tube with respect to the internal tube can be performed by means of a controller bearing reference number 56 in FIG. 7. The controller 56 can take into account the parameters of the upstream flow of the multiphase effluent, for example the thermodynamic parameters determined by means of pressure and temperature detectors and the value of the effluent flow rate determined by an appropriate device, these detectors being represented as a whole by reference number 58. The parameters are transmitted to the controller through a line 57. In FIG. 7, the whole of the upstream detector is located substantially at the bottom of the water. It can of course be set in another place of the upstream circuit, for example in the vicinity of the wellhead, without departing from the scope of the present invention. This assembly can notably consist of a static pressure tap and a dynamic pressure tap. The controller can take into account the variations in the difference of the pressure values of these two taps.

The controller 56 can also take into account parameters representing the working conditions of pump 59 by means of detectors connected by line 60, for example by measuring the torque and the rotating speed of the pump. It is also possible to determine, by means of appropriate detectors, the pressure and the flow rate of the multiphase effluent at the pump outlet. The controller can also take into account the value of the liquid level in the regulating drum, by means of a detector 61 connected to the controller by a line 62. Finally, the pressure prevailing in the regulating drum can also be measured by a detector 63 and transmitted through line 64 to the controller. This controller, by integrating these various data, will act upon the relative position of the cylinders 27 and 28 in order to adjust at best the characteristics of the section of flow provided for the multiphase effluent. The man skilled in the art will be able to determine the various shapes of the section of flow according to the requirements linked to each production pattern.

Figure 8:
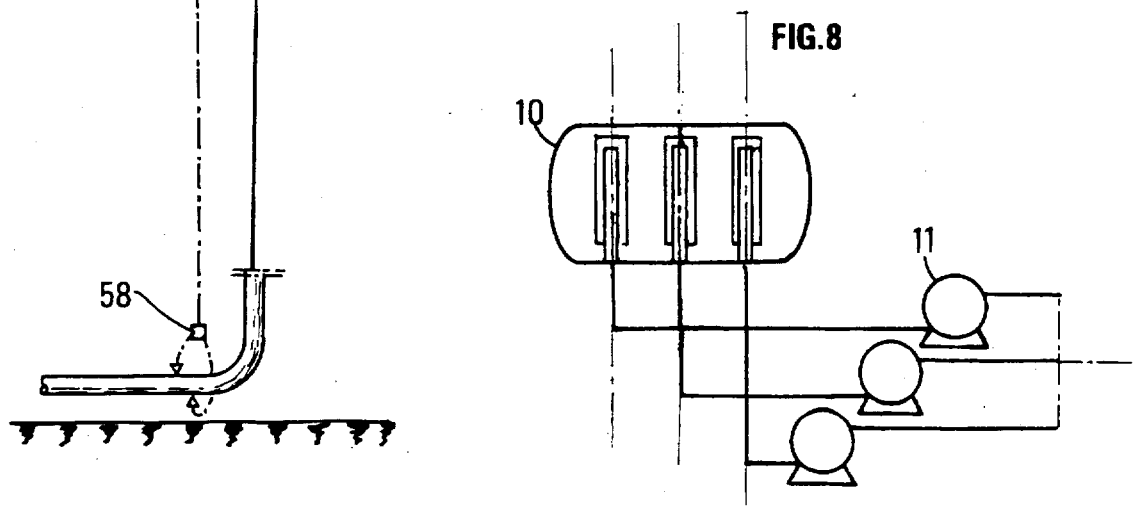
FIG. 8 is a diagram in which a single drum comprises several sample tubes according to the invention, each feeding a multiphase pump.

Several sample tubes according to the invention can be used and placed in a single drum for feeding at least one pump (see FIG. 8) without departing from the scope of the present invention.

I claim:
1. A system comprising:
   a drum;
   an assembly, located in the drum, for drawing a multiphase fluid contained in the drum to outside the drum, the assembly including a section through which the multiphase fluid is drawn to flow outside the drum, and extending over a substantial portion of a height of the drum;
   one sensor for sensing at least one flow condition of the multiphase fluid and for providing a signal representing at least one sensed flow condition of the multiphase fluid; and
   a mechanism, coupled to the at least one sensor comprised of at least two relatively moveable, perforated surfaces defining openings of adjustable cross section, for modifying the drawing of multiphase flow into the section as a function of the signal representing a sensed flow condition.
2. A system in accordance with claim 1 wherein:
   the at least two perforated surfaces are coaxial cylinders and are rotatable relative to each other.
3. A system in accordance with claim 2 wherein:
   at least one of the coaxial cylinders is fixed relative to the drum and another of the coaxial cylinders is rotatable about an axis of revolution; and the mechanism further comprises
   means, disposed outside the drum, connected to the another of the coaxial cylinders, for rotating the another of the coaxial cylinders in response to each signal representing a sensed flow condition.

4. A system in accordance with claim 3 wherein:

the at least two perforated cylinders are vertically disposed when the multiphase fluid is being drawn through the section.

5. A system in accordance with claim 3 wherein:

the drum comprises a fluid inlet port located at one end thereof and the assembly is located at another end of the drum.

6. A system in accordance with claim 2 wherein:

the at least two perforated cylinders are vertically disposed when the multiphase fluid is being drawn through the section.

7. A system in accordance with claim 6 wherein:

the drum comprises fluid inlet port located at one end thereof and the assembly is located at another end of the drum.

8. A system in accordance with claim 1 wherein:

the drum comprises a cylindrical casing having a horizontal axis when the multiphase fluid is being drawn through the section; and the assembly has a vertical axis when the multiphase fluid is being drawn through the section.

9. A system in accordance with claim 1 wherein:

the assembly comprises at least one fixed section located in a lower part of the drum for drawing off a liquid phase.

10. A system in accordance with claim 1 wherein:

the assembly is connected to a suction side of a multiphase pump.

11. A system in accordance with claim 10 wherein:

the mechanism for modifying the section is further responsive to a working condition of the multiphase pump to modify the section.

12. A process for regulating a multiphase effluent comprising:

causing the multiphase effluent to flow into a drum containing a mechanism comprising at least two relatively moveable, perforated surfaces defining openings of adjustable cross section for drawing the multiphase effluent from the drum;

sensing at least one flow condition of the multiphase effluent; and adjusting flow through the mechanism as a function of the at least one sensed flow condition of the multiphase effluent.

* * * * *